(12) United States Patent
Caiger (10) Patent No.: US 7,331,512 B2
(45) Date of Patent: Feb. 19, 2008

(54) MONITORING AND CONTROLLING OF LASER OPERATION

(75) Inventor: Simon George Caiger, Rugby (GB)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/288,830

(22) Filed: Nov. 29, 2005

(65) Prior Publication Data
US 2006/0113375 A1    Jun. 1, 2006

(51) Int. Cl.
*G06F 7/00*    (2006.01)
(52) U.S. Cl. ............... 235/376; 118/726; 118/727; 118/730
(58) Field of Classification Search ........... 118/726, 118/727, 730; 235/376
See application file for complete search history.

(56) References Cited

U.S. PATENT DOCUMENTS

| | | |
|---|---|---|
| 3,932,794 A | 1/1976 | Iwako |
| 3,999,043 A | 12/1976 | Reiss et al. |
| 4,151,567 A | 4/1979 | Dorsemagen et al. |
| 4,282,468 A | 8/1981 | Barker et al. |
| 4,398,241 A | 8/1983 | Baker et al. |
| 4,514,671 A | 4/1985 | Louth |
| 4,532,402 A | 7/1985 | Overbeck |
| 4,536,806 A | 8/1985 | Louth |
| 4,624,368 A | 11/1986 | Satake |
| 4,631,605 A | 12/1986 | O'Gwynn |
| 4,646,280 A | 2/1987 | Toyosawa |
| 4,670,653 A | 6/1987 | McConkle et al. |
| 4,809,253 A | 2/1989 | Baas et al. |
| 4,845,698 A | 7/1989 | Baas |
| 4,864,295 A | 9/1989 | Rohr |
| 4,870,631 A | 9/1989 | Stoddard |
| 4,893,068 A | 1/1990 | Evans, Jr. |
| 4,903,131 A | 2/1990 | Lingemann et al. |
| 4,930,027 A | 5/1990 | Steele et al. |
| 4,956,831 A | 9/1990 | Sarraf et al. |
| 4,961,117 A | 10/1990 | Rumley |
| 4,965,513 A | 10/1990 | Haynes et al. |
| 4,972,344 A | 11/1990 | Stoddard et al. |
| 5,075,875 A | 12/1991 | Love et al. |
| 5,093,608 A | 3/1992 | Kono et al. |
| 5,119,213 A | 6/1992 | Graves et al. |
| 5,122,720 A | 6/1992 | Martinson et al. |

(Continued)

FOREIGN PATENT DOCUMENTS

CA    2359739    4/2003

(Continued)

OTHER PUBLICATIONS

Levy, G.F.: "Numeric Activex Components" Software Practice & Experience, John Wiley & Sons Ltd, Chichester, GB, vol. 31, No. 2, Feb. 2001, p. 147-189.

(Continued)

*Primary Examiner*—Karl D. Frech
(74) *Attorney, Agent, or Firm*—Gauthier & Connors, LLP (57) ABSTRACT

A laser monitoring and controlling apparatus is disclosed that includes a laser, a data server and a laser Graphical User Interface (GUI). In an embodiment, the apparatus further includes, an imaging means and means for displaying images from the imaging means on the GUI.

20 Claims, 6 Drawing Sheets

U.S. PATENT DOCUMENTS

| | | | |
|---|---|---|---|
| 5,167,002 A | 11/1992 | Fridhandler | |
| 5,185,676 A | 2/1993 | Nishiberi | |
| 5,187,364 A | 2/1993 | Blais | |
| 5,225,770 A | 7/1993 | Montagu | |
| 5,229,574 A | 7/1993 | Stone | |
| 5,257,041 A | 10/1993 | Kresock et al. | |
| 5,275,041 A | 1/1994 | Poulsen | |
| 5,280,377 A | 1/1994 | Chandler et al. | |
| 5,285,378 A | 2/1994 | Matsumoto | |
| 5,293,102 A | 3/1994 | Martinson et al. | |
| 5,313,147 A | 5/1994 | Yoneda et al. | |
| 5,331,264 A | 7/1994 | Cheng et al. | |
| 5,406,496 A | 4/1995 | Quinn | |
| 5,424,526 A | 6/1995 | Leonhardt et al. | |
| 5,424,632 A | 6/1995 | Montagu | |
| 5,452,285 A | 9/1995 | Monen | |
| 5,453,618 A | 9/1995 | Sutton et al. | |
| 5,534,071 A * | 7/1996 | Varshney et al. | 118/726 |
| 5,537,109 A | 7/1996 | Dowd | |
| 5,541,486 A | 7/1996 | Zoller et al. | |
| 5,585,976 A | 12/1996 | Pham | |
| 5,589,870 A | 12/1996 | Curry et al. | |
| 5,600,121 A | 2/1997 | Kahn et al. | |
| 5,604,516 A | 2/1997 | Herrod et al. | |
| 5,610,487 A | 3/1997 | Hutsell | |
| 5,646,765 A | 7/1997 | Laakmann et al. | |
| 5,653,900 A | 8/1997 | Clement et al. | |
| 5,656,908 A | 8/1997 | Rehm | |
| 5,699,494 A | 12/1997 | Colbert et al. | |
| 5,726,883 A | 3/1998 | Levine et al. | |
| 5,767,494 A | 6/1998 | Matsueda et al. | |
| 5,801,371 A | 9/1998 | Kahn et al. | |
| 5,805,448 A | 9/1998 | Lindsay et al. | |
| 5,808,725 A | 9/1998 | Moberg et al. | |
| 5,869,945 A | 2/1999 | Ha et al. | |
| 5,886,335 A | 3/1999 | Matsueda | |
| 5,886,422 A | 3/1999 | Mills | |
| 5,912,541 A | 6/1999 | Bigler et al. | |
| 5,914,924 A | 6/1999 | Takagi et al. | |
| 5,986,989 A | 11/1999 | Takagi et al. | |
| 6,041,287 A | 3/2000 | Dister et al. | |
| 6,054,828 A | 4/2000 | Hill | |
| 6,072,653 A | 6/2000 | Goker | |
| 6,081,751 A | 6/2000 | Luo et al. | |
| 6,107,600 A | 8/2000 | Kurosawa | |
| 6,144,011 A | 11/2000 | Moss et al. | |
| 6,198,176 B1 | 3/2001 | Gillette | |
| 6,198,246 B1 | 3/2001 | Yutkowitz | |
| 6,199,018 B1 | 3/2001 | Quist et al. | |
| 6,211,484 B1 | 4/2001 | Kaplan et al. | |
| 6,211,639 B1 | 4/2001 | Meister et al. | |
| 6,211,640 B1 | 4/2001 | Fujisaki et al. | |
| 6,256,121 B1 | 7/2001 | Lizotte et al. | |
| 6,275,319 B1 | 8/2001 | Gadhok | |
| 6,304,359 B1 | 10/2001 | Gadhok | |
| 6,317,637 B1 | 11/2001 | Limroth | |
| 6,350,239 B1 | 2/2002 | Ohad et al. | |
| 6,423,350 B2 | 7/2002 | Shiau et al. | |
| 6,442,444 B2 | 8/2002 | Matsubara et al. | |
| 6,445,962 B1 | 9/2002 | Blevins et al. | |
| 6,449,564 B1 | 9/2002 | Kliman et al. | |
| 6,453,722 B1 | 9/2002 | Liu et al. | |
| 6,463,352 B1 | 10/2002 | Tadokoro et al. | |
| 6,496,782 B1 | 12/2002 | Claus et al. | |
| 6,510,353 B1 | 1/2003 | Gudaz et al. | |
| 6,577,907 B1 | 6/2003 | Czyszczewski et al. | |
| 6,622,099 B2 | 9/2003 | Cohen et al. | |
| 6,646,397 B1 | 11/2003 | Discenzo | |
| 6,697,685 B1 | 2/2004 | Caldwell | |
| 6,721,445 B1 | 4/2004 | Azencott | |
| 6,774,601 B2 | 8/2004 | Schwartz et al. | |
| 6,782,296 B2 | 8/2004 | Hoche | |
| 6,822,415 B1 | 11/2004 | Komiya et al. | |
| 6,826,519 B1 | 11/2004 | Fujino | |
| 6,853,951 B2 | 2/2005 | Jarrell et al. | |
| 6,876,167 B1 | 4/2005 | Jones | |
| 6,885,972 B2 | 4/2005 | Samata et al. | |
| 6,937,908 B2 | 8/2005 | Chang et al. | |
| 7,039,557 B2 | 5/2006 | Mayer et al. | |
| 2001/0011550 A1 | 8/2001 | Zheng | |
| 2002/0037520 A1* | 3/2002 | Nikiforov et al. | 435/6 |
| 2002/0049513 A1 | 4/2002 | Nussbaum et al. | |
| 2003/0128240 A1 | 7/2003 | Martinez et al. | |
| 2003/0163296 A1 | 8/2003 | Richards | |
| 2004/0135534 A1 | 7/2004 | Cullen | |
| 2005/0174124 A1 | 8/2005 | Huang | |

FOREIGN PATENT DOCUMENTS

| | | |
|---|---|---|
| DE | 4211213 | 10/1993 |
| EP | 0260138 | 9/1987 |
| EP | 0378093 | 7/1990 |
| EP | 0339402 | 3/1993 |
| EP | 0260138 | 7/1993 |
| EP | 896265 | 7/1998 |
| EP | 1283593 | 2/2003 |
| EP | 1298511 | 4/2003 |
| FR | 2600789 | 12/1987 |
| GB | 951785 | 3/1964 |
| JP | 63190584 | 8/1988 |
| JP | 01224189 | 9/1989 |
| JP | 04229088 | 8/1992 |
| JP | 05036851 | 2/1993 |
| JP | 07114402 | 5/1995 |
| JP | 2000028955 | 1/2000 |
| JP | 2000-330641 | 11/2000 |
| JP | 2001142917 | 5/2001 |
| JP | 2001-245488 | 9/2001 |
| JP | 2002199147 | 7/2002 |
| JP | 2003044111 | 2/2003 |
| WO | WO9318525 | 9/1993 |
| WO | WO99/17282 | 4/1999 |
| WO | WO01/33303 | 5/2001 |
| WO | WO01/64591 | 9/2001 |
| WO | WO03/097290 | 11/2003 |

OTHER PUBLICATIONS

Huang GQ et al.: "Web-based product and process data modeling in concurrent 'design for X'" Robotics and Computer Integrated Manufacturing, Pergamon Press, Oxford, GB, vol. 15, No. 1, Feb. 1999, p. 53-63.

Datasheets for Copley Controls Corp., 2002 (4 pages).

"Digital Servoamplifier Upgrades Brush Motor Drive Systems," Copley Controls Corp., New Product Release dated Apr. 28, 2002, pp. 1-7.

Y. Tzou, "Auto-tuning Control of Self-Commissioning Electric Drives," Power Electronics and Mechatronics Control Lab., Dept. of Electrical & Control Engineering, National Chiao Tung Univ., Taiwan, pp. 483-487.

Opposition Communication dated Jan. 3, 2006 and translation of pending claims in opposition proceeding regarding EP 896265.

B.A. Brandin, "A digital approach to the disturbance-accommodation problem," Transactions of the Institute of Measurement and Control, vol. 10, No. 5, Oct. 1988, London, UK, pp. 273-280.

C.C. Hang et al., "On-Line Auto Tuning of PID Controllers Based on the Cross-Correlation Technique," IEEE Transactions on Industrial Electronics, vol. 38, No. 6, Dec. 1991, New York, US, pp. 428-437.

C.C. Hang et al., "Development of An Intelligent Self-Tuning PID Controller," Advances in Instrumentation and Control, vol. 47, No. 2, Jan. 1992, Research Triangle Park, US, pp. 1101-1111.

Y.H. Huang et al., "Autotuning of a servowriter head positioning system with minimum positioning error," J. Appl. Phys. vol. 79, No. 8, Apr. 15, 1996, pp. 5674-5676.

Birou et al., "Real-time robot driver control with PM-synchronous motors using a DSP-based computer system," Power Electronics and Motion Control Conference, 2000. Proceedings. PIEMC 2000. The Third International Aug. 15-18, 2000, Piscataway, NJ, USA, IEEE, vol. 3, Aug. 15, 2000, pp. 1290-1295.

Scanlab, Smart Scanning-inteliScan 10, Aug. 2003, SCANLAB America, Inc., Cincinnati, Ohio.

Phototonics Spectra, Cambridge Technology Inc. Digital Control Center DC900, Jul. 2003, http://www.photonics.com/spectra/minimag/XQ/ASP/minimagid.70/QX/read.htm.

Lasesys Corporation, Series LBS-6000 Galvanometric Scanners, Feb. 6, 2004, http:www.lasesys.com/galvanometric.html.

* cited by examiner

FIG. 1
Simple COM Application

FIG. 2
Complex COM Application

FIG. 3
Simple DCOM Application

MONITORING AND CONTROLLING OF LASER OPERATION

This invention relates to monitoring and controlling of laser operation.

This application claims priority to PCT/GB2004/002550 filed Jun. 14, 2004, which claims priority to GB Application No. 0313887.2 filed on Jun. 16, 2003.

In particular, it relates to a system for monitoring and controlling laser parameters and operation from applications other than those supplied by the laser vendor.

It is a frequent requirement for laser system integrators to monitor and control laser parameters and operation from third party applications, i.e. applications other than those supplied by the laser vendor.

The laser control requirements of the integrator can vary enormously depending upon the size and type of application. At the most basic level, it may be required to periodically monitor a few laser parameters. On a more complex level, it may involve the integration of a robotic system which is required to both monitor and control the laser. Application complexity may be further increased with multi-laser multi-robot systems with supervisory controllers potentially running on any mix of shared or separate platforms and which may be distributed over a network, whether a local area network or a wide area network or even over the Internet.

The plurality of lasers and/or robots in such a system may also run on any combination of shared or separate platforms such as different computer operating systems, application programs and so on.

An existing known technology which can be implemented for the monitoring and controlling of industrial laser applications, is OPC (Object Linking and Embedding [OLE] for Process Control).

This can, however, be inflexible and also generally requires the payment of a separate licence fee for each server implementation, which greatly increases cost.

This approach may also enable data to be only accessible in one way, and it may be difficult to customise or to easily add or remove features as desired.

The present invention arose in an attempt to provide an improved and flexible method for connecting third party client software for the purposes of monitoring and controlling laser apparatus.

According to the present invention in a first aspect there is provided laser monitoring and/or controlling apparatus including a COM (Component Object Model) interface or DCOM interface.

The present invention further provides laser monitoring and/or controlling apparatus comprising one or more lasers, a laser GUI (Graphical User Interface) and a data server.

According to the present invention there is further provided laser monitoring and controlling apparatus including at least one laser operating module, an ActiveX component and a laser, the ActiveX component serving as a data server.

Preferably, a further or third party application (preferably COM enabled) is also provided and the ActiveX component operates as a data server for the applications.

The laser may be connected to the component by means of a serial laser interface.

The apparatus may comprise the data server (ActiveX component), laser GUI and at least one third party application all on a computer, or shared computer platform, connected to the laser over an interface such as a serial laser interface.

The laser application module, ActiveX component and third party application may be installed on a single computer connected to the laser or may be provided on separate computers or platforms.

The apparatus may further include an external controller (e.g. robot, PLC or custom controller) connected to the computer by, for example, a serial, parallel or TCP/IP connection and connected to the laser by an interface such as a digital interface.

The apparatus may comprise the data server and laser GUI on one computer or platform, and/or one or more further applications, COM enabled application or other third party application, on a second computer or platform. The computers may be linked by any suitable means, such as TCP/IP, (Internet Protocol) connections.

The apparatus may comprise a plurality of third party applications and laser GUI's, distributed over a plurality of computers. One or more than one application may be mounted on each computer.

A plurality of lasers and/or external controllers may be used, each laser being connected by a suitable interface to a computer.

In embodiments of the invention an ActiveX component is used as a data server to which client applications may attach. Using industry standard COM technology, methods, properties and events can be exposed to allow attached client applications to monitor and control a laser. The use of COM technology enables standard software packages such a Microsoft Word, Microsoft Excel, Microsoft Access or many other types of software packages or standard control software such as SCADA and SPC packages to be integrated.

The application may enable many different monitoring and control applications or to implement a number of different monitoring and control data structures. For example, this can include the monitoring of a single parameter, such as laser on or demanded power. Alternatively, monitoring may be done on parameter blocks, such as a water cooler data report which includes all parameters relating to the water cooler which is essential to the laser.

Yet alternatively, monitoring and control of the full data structure may be made. This can include the status of all laser parameters if read by the client, or sets the demanded state of all laser parameters if written to by the client.

A standard laser Graphical User Interface (GUI) can connect to the server as a client. This may be optionally displayed to a user on a suitable display means, or can be run in the background as a system tray component when Microsoft Windows or another type of operating system is used. In this way all the controlled or monitored parameters can be viewed on a single GUI as a single display, or on multiple displays if required.

The GUI, third party client applications and ActiveX components may be either all running on the same computer platform in the standard COM configuration or may be on any mix of networked computers via Distributed COM (DCOM).

Multiple third party clients and multiple lasers may attach to the same server component.

The invention further provides a laser monitoring and/or control system in which an ActiveX component is used as a link client.

Traditionally, when it is required to visually monitor a laser process a camera has been mounted to view the process or, more usually, to view a workpiece as it is processed. Images (video or still) from the camera are viewed on a monitor. Thus, the laser operator views the images on one monitor (generally a TV type monitor) and operates the laser using a separate laser Graphical User Interface (GUI) on a separate PC or other display monitor.

According to the present invention there is further provided a laser monitoring and/or controlling apparatus comprising a laser, a laser control and/or monitoring apparatus, a Graphical User Interface (GUI) for monitoring and/or controlling laser operation, an imaging means and means for displaying images from the imaging means on the GUI.

The imaging means is preferably a video or still camera, mounted to view a workpiece. The camera is preferably mounted adjacent the laser to view a workpiece in a parallel direction to the direction of a laser beam emitted by the laser.

In a further aspect the invention provides a laser apparatus comprising any or more of the features described herein.

Embodiments of the invention will now be described, by way of example only, with reference to the accompanying drawings, in which.

Figure 1:
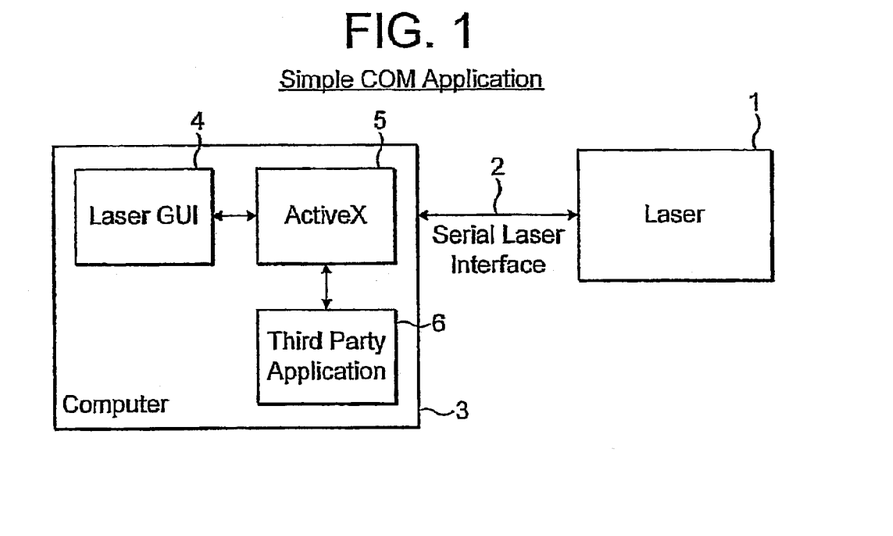
FIG. 1 shows a simple COM application of a laser control system.

Referring to FIG. 1, a laser 1 (which would generally include an integral or external water cooling system, which is not shown for clarity) is connected via a serial interface 2 to a computer 3. The computer includes, as a software component, a laser GUI 4 which may be a proprietary GUI which can interface to a display (not shown) for a user to control laser parameters, e.g. by using a graphical interface. The laser GUI can connect (generally by software connections) to an ActiveX component 5. Third party applications 6 may also connect to the ActiveX component and these may be standard software packages such as MS Word, MS Excel, and so on.

In this example, the laser GUI 4, ActiveX component 5 and third party client application 6 all run on the same computer platform 3.

The ActiveX component in effect provides a link client to the server, linking the laser GUI and/or third party application 6. The ActiveX component provides all or some information relating to the laser and its operation and acts as a data server to which client applications may attach.

The laser GUI 4 may be, optionally, visible or running in the background.

Typical applications of this embodiment may be as follows:

Firstly, if a customer wishes to periodically log one or more laser parameters then the laser can be controlled through the ActiveX component 5 and a third party application may be an application such as Microsoft Excel, Microsoft Access or any other standard or custom COM enabled software application which can be used for logging these parameters. Alternatively, a customer may have their own software application which they can use as the third party application 6 to monitor and control the laser. This application may also perform other, customer specific, functions.

Figure 2:
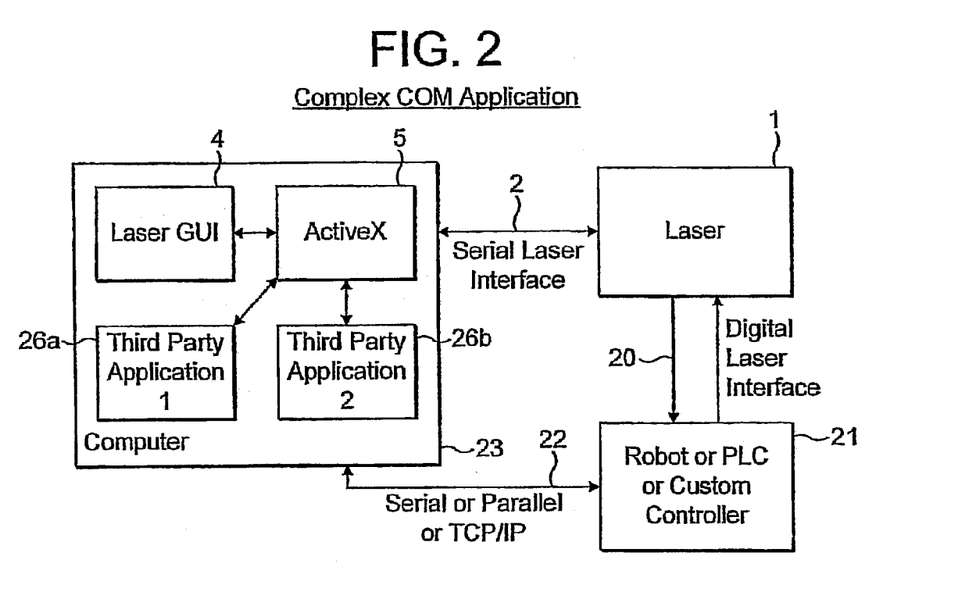
FIG. 2 shows an alternative COM application of a laser control system.

FIG. 2 shows a more complex COM application in which the computer 23 includes two third party applications 26a and 26b in addition to the laser GUI 4 and ActiveX component 5. This is again connected to the laser 1 via serial laser interface 2. In addition, the laser is connected via a digital laser interface 20 (typically a bi-directional interface which may be a proprietary interface or a standard interface) to a robot, PLC or custom controller 21. This is also connected by a separate connection 22 to the computer 23 and connection 22 may be, for example, a serial connection, a parallel connection or an Internet connection, e.g. using TCP/IP protocol. It may alternatively be other types of connection, either local such as a serial link, or a more remote type of connection such as an Internet connection.

In the example of FIG. 2, the laser GUI 4, ActiveX component 5 and the two third party client applications 26a and 26b all run on the same computer platform.

Note that although in the drawings components are shown as showing a computer, this may mean simply comparing sharing a common computer platform and the components may be distributed over several networked computers.

All laser parameters are available, in the embodiment of FIG. 2, to both of the third party client applications 26a and 26b for the purposes of monitoring and controlling the laser since both of these are connected to the ActiveX component 5. The robot, PLC or custom controller represents an external controller which may utilise a parallel laser interface for very high speed laser control function and, as discussed, this may interface from the host computer via any required type of connection.

The laser GUI may, optionally, be visible or running in the background.

Typical applications for the embodiment of FIG. 2 are as follows:

The external controller such as a robot, PLC or custom controller may have its own interface program which is, for example, third party application 1 (26a) running on the host computer. This application can optionally monitor and control the laser via the ActiveX component or via the digital laser interface 20. In this scheme, any mix of laser control may be achieved, either through the ActiveX or via the digital laser interface. For example, in one version the third party controller may be used to open and close the shutter of the laser (not shown) to permit laser operation via the digital laser interface 20 and parameter set up and laser monitoring may then be performed via the ActiveX component 5.

The second third party application 26b may then simply be used to periodically log one or many laser parameters and can then be any standard or custom COM enabled software application such as MS Excel, MS Access or so on, or it may be a customer specific application which the customer wishes to use to monitor and control the laser. This application may also then perform other customer specific, functions.

Figure 3:
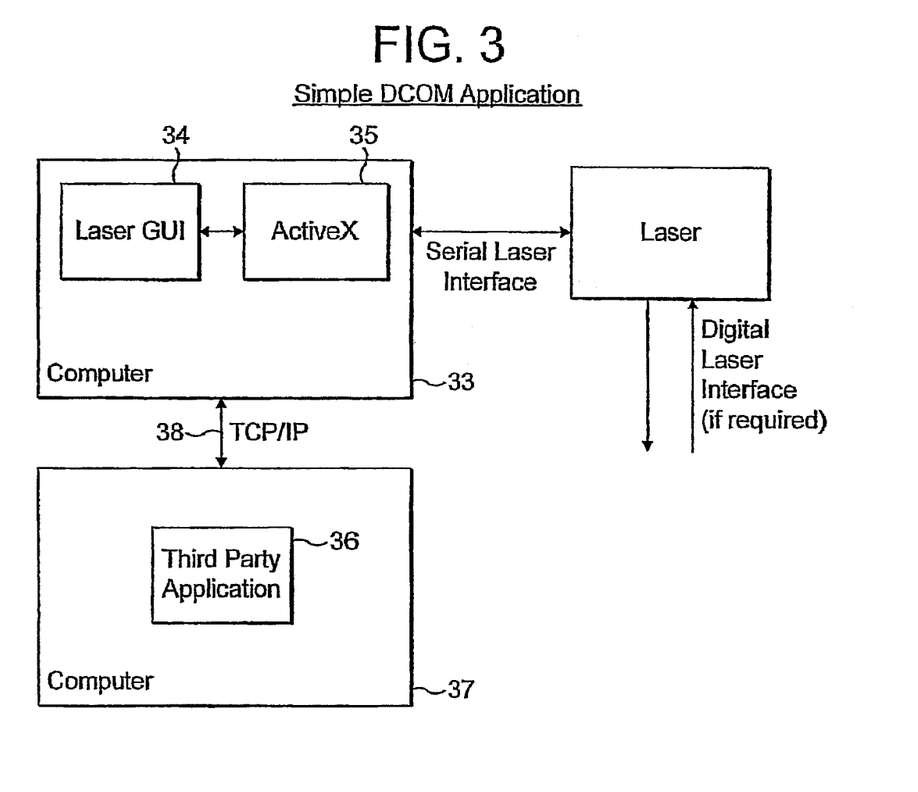
FIG. 3 shows a DCOM laser control application.

FIG. 3 shows a DCOM (Distributed COM) application. In this example, a first laser GUI 34 and ActiveX component 35 run on a first computer 33. A third party application 36 is running on second computer 37. First computer 33 is connected in the same manner as that of the other embodiments to laser 3 which may also optionally be connected via a digital laser interface to an external controller (not shown). The second computer 37 is connected to the first computer 33 via, for example, a TCP/IP protocol connection 38.

In this embodiment, all laser parameters are available to the third party client applications for the purposes of monitoring and controlling the laser. Typical applications of this might be when the third party application is a plant monitoring system, e.g. a SCADA (Supervisory Control and data Acquisition) system located remotely to the laser. Since the connection is by TCP/IP it may be located at an entirely separate location and connected over the Internet.

The third party application could also be a robot, PLC, custom controller or other external controller implemented as described in relation to the embodiment of FIG. 2.

Figure 4:
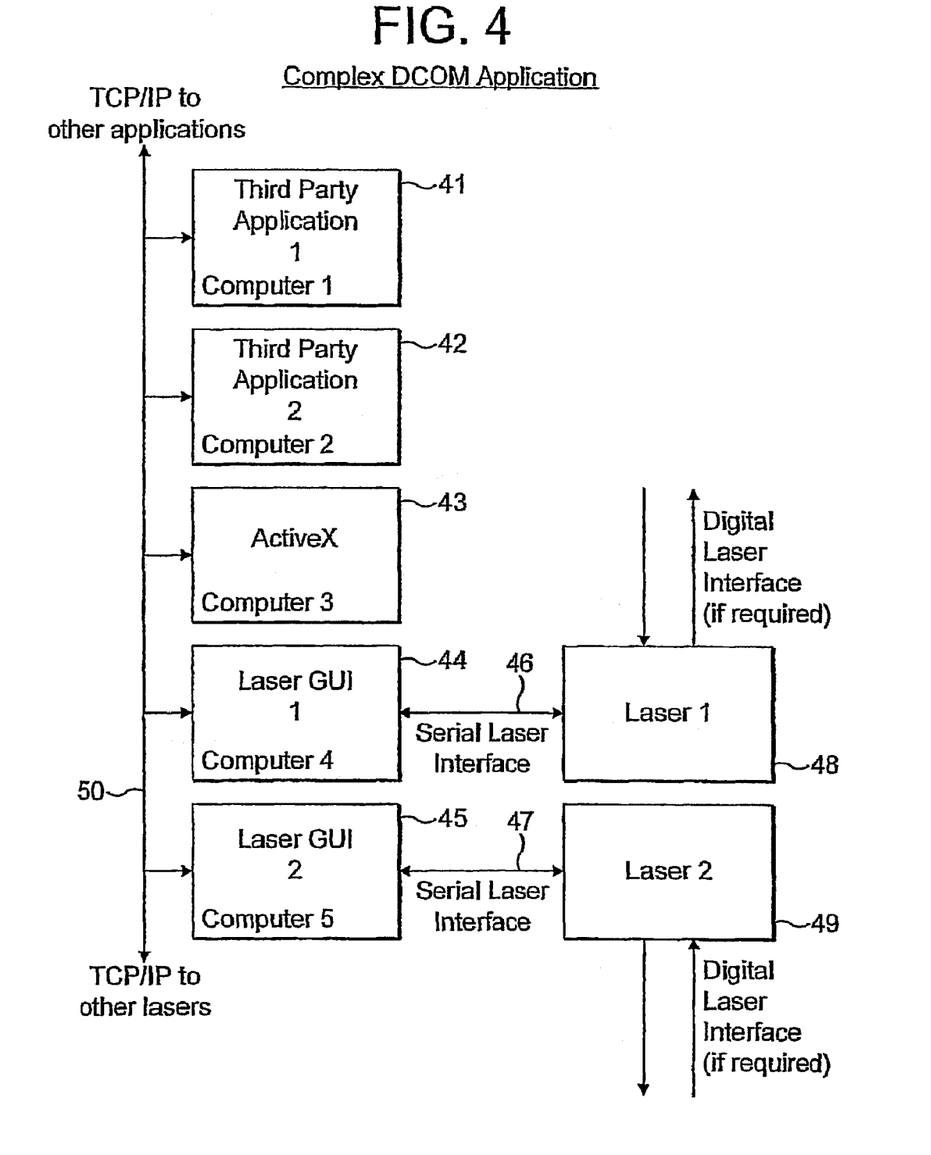
FIG. 4 shows an alternative DCOM laser control system.

FIG. 4 shows a more complex DCOM application. In this embodiment, by way of example, five separate computers 41 to 45 are shown. Separate third party applications reside on each of computers 41 and 42. The ActiveX component resides on computer 43 and two separate laser GUI's reside on respective computers 44 and 45. Note that other numbers of third party applications and laser GUI's may be provided, or only one of either or both of these. Each of the laser GUI's on computer 44 and 45 are connected via a serial laser interface 46 and 47 respectively to respective lasers 48 and 49. These may also each be connected via digital laser interface if required to an external controller. Each of the computers may be connected to each other in a suitable manner, but preferably this is by TCP/IP connection 50 which may then be connected as shown to other lasers or to other applications.

All laser parameters are available to each of the third party client applications for the purposes of monitoring and controlling the laser. The single ActiveX component is capable of serving data relating to multiple lasers.

As with the other embodiments, the laser GUI's 44 and 45 may optionally be visible or running in the background.

The third party software may be any mix of any COM enabled software application, data logging, robot/PLC/custom controller or SCADA. Additional third party client applications may be running on any of the computer platforms if desired, for example on the same computer platform as any of the laser GUI's or ActiveX component or different ones.

If the third party application is a robot, PLC or custom controller, then interface may be implemented if required as described for the embodiment of FIG. 2.

A typical application of an embodiment such as that of FIG. 4 is for a multi-laser installation with plant monitoring software (SCADa) running on a remote computer. Note that the laser in this example may be physically located a long way away from each other if necessary.

In embodiments of the invention, the ActiveX component acts as a data server to which client applications may attach.

The invention may be applied to any type of laser. These may for example be ND:YAG lasers or others. The construction of lasers is well known, and includes one or more laser media (e.g. laser rods) pumped by a pumping means such as pumping lamps. A water cooling system is usually necessary.

It is often desired to be able to view a processing operation being performed on a workpiece by a laser. Traditionally, this has been done by setting up an imaging device (e.g. video or still camera) and viewing images from this device on a TV or other monitor screen. This has up to now, always been a separate monitor screen from the display on which the GUI is viewed.

In a further aspect of the invention, which may be combined with any of the aspects previously disclosed, a video camera or other imaging device is mounted to produce images of a process while the process is ongoing and to send these images, if desired, directly to the GUI on the display which the operator uses to control and monitor parameters of the processing operation.

Figure 5:
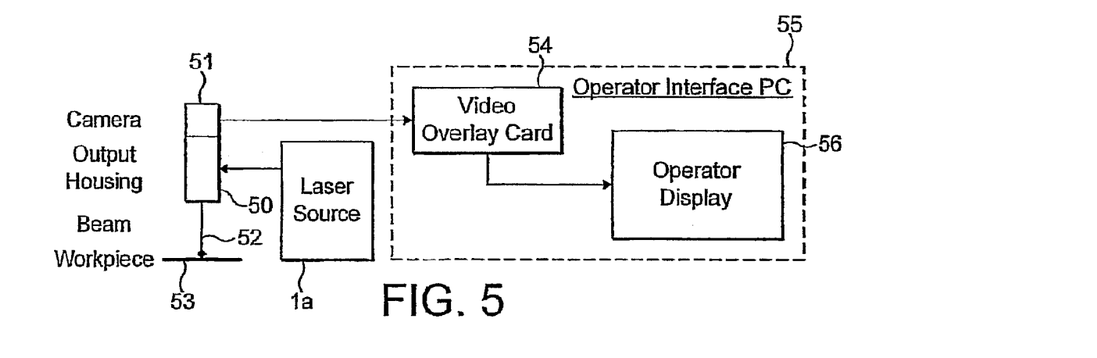
FIG. 5 shows a system including an imaging system.

FIG. 5 shows one example of this. In the figure, the laser source 1a is controlled (by means not directly shown) to emit a laser to an output housing 50 which also mounts a camera 51. This is preferably a video camera, typically a digital video camera, or may be a digital still camera or another imaging means, based upon a CCD or CMOS imaging array for example. The beam 52 from the laser source and the camera are both directed towards a workpiece 53. The camera is connected to a video overlay card 54 forming part of an operator interface PC 55 and this may be a video card of a PC. The video overlay card is then arranged, in known manner, to display, when required, the video signal as part of the operator display 56.

Video overlay cards are commercially available but have never before been applied to a laser user interface.

As described, traditionally, the functionality of live image viewing has been achieved only by using an external display, typically an external CRT (Cathode Ray Tube) display and a crosshair generator. In embodiments of the present invention, the display and crosshair generator is integrated with the laser GUI and therefore provides greatly improved access and controllability.

Figure 6:
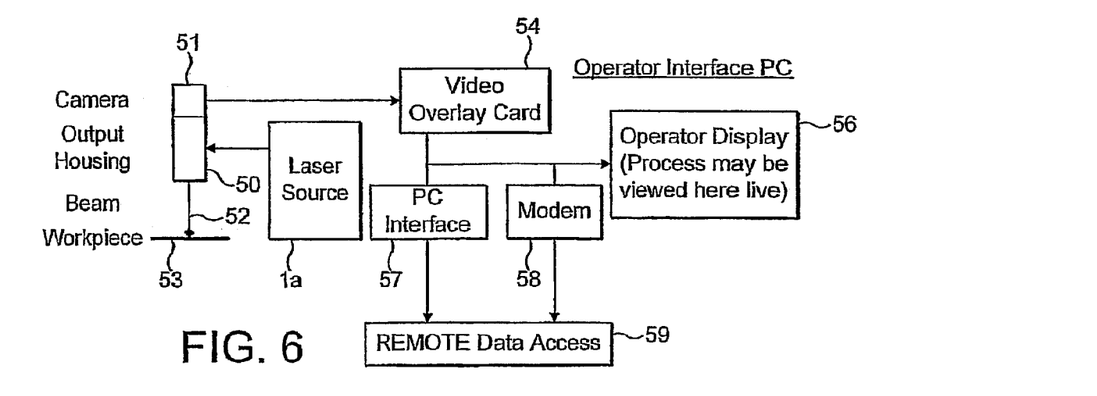
FIG. 6 shows a system including an imaging system and with remote access.

FIG. 6 shows an alternative embodiment in which remote access may be made to the video and operator display (GUI). In this case, similar components to FIG. 5 are given similar numbers. The video overlay card 54 is connected to a PC interface 57 for transmissions over a network and to a modem or similar device (e.g. ISDN adaptor), broadband adaptor. From here, remote data access 59 may be obtained. This may be obtained over the Internet to a terminal anywhere in the world, or over a LAN, WAN or other network as appropriate.

Use of this feature of the invention enables the laser process monitoring function to be embedded into a laser user interface and so to present the user with a single interface for all laser monitoring and control functions. As described, it eliminates the requirement for an external monitor and crosshair generator and also has cost benefits. Furthermore, it provides a facility to record either still and video images of the laser process at any stage. Video may be stored locally and retrieved by remote access by modem or network connection.

In practice, a video overlay card, for example, the Haupgauge Win TV range of cards may be fitted to a spare slot on a PC in which the basic laser operating system is running. The output from the camera 51 is fed into this video overlay card 54. The operator display software then automatically detects the presence of the video hardware and provides the user with functionality which includes, as non-limiting examples, the following:

a) the recording and playing back of video streams and still images;
b) freezing of a displayed image;
c) printing of still images;
d) date, time and additional text appending to still images;
e) adjustment of brightness and contrast of video display;
f) adjustment of position of crosshairs to coincide with beam alignment;
g) adjustment of colour of crosshairs to accommodate different backgrounds;
h) the transfer of saved still and video images via modem or network.

Figure 7:
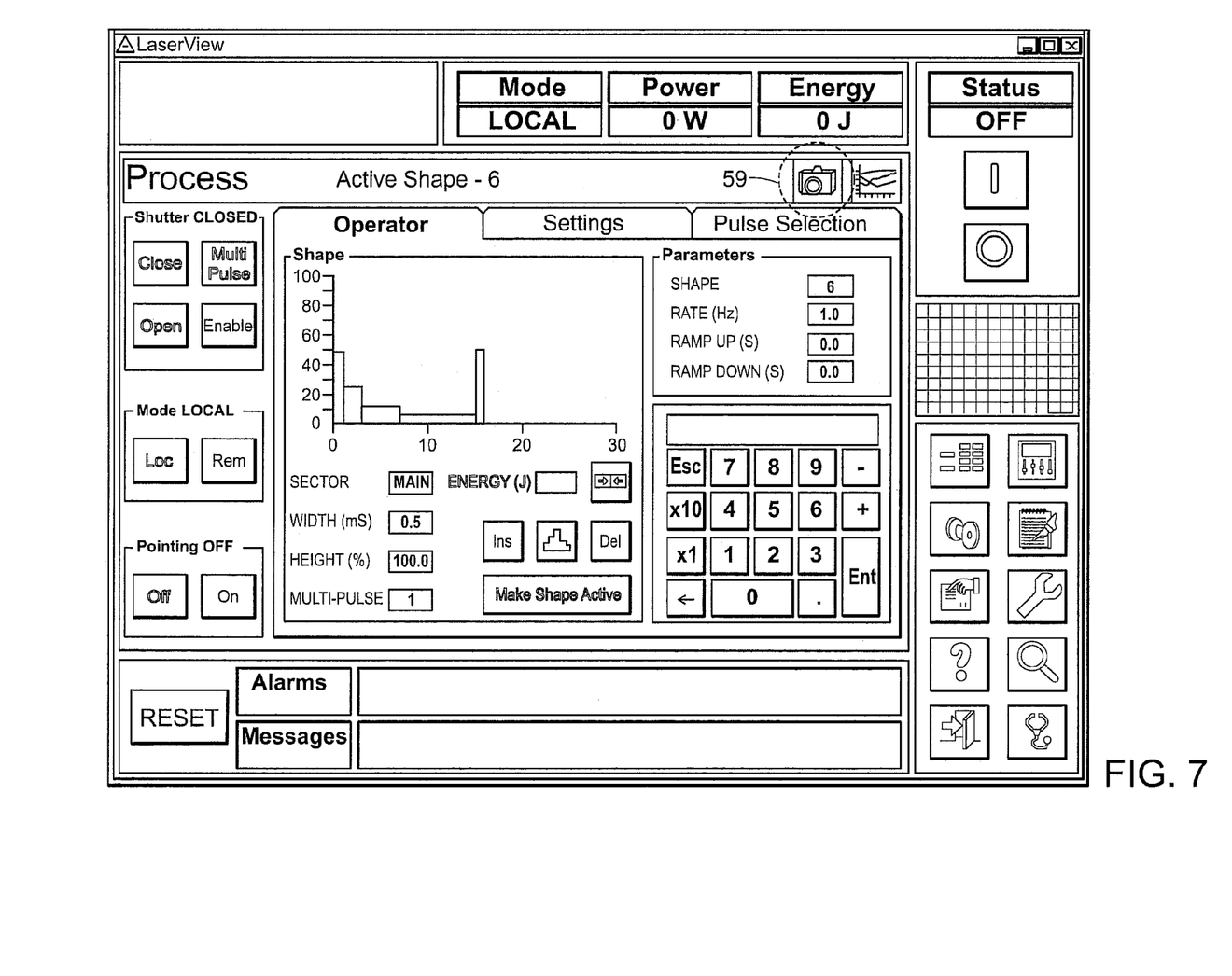
FIGS. 7 and 8 show screen displays.

FIG. 7 shows one non-limiting example of a display interface (GUI) with which an operator may monitor and control laser operation. The display has a series of functions which the operator can use to control the process, and which may be provided at a local machine to the laser itself, or a remote one, as is described above. ActiveX components and other components may be used to control this and to link to various PC's over a network. This also includes a camera icon 60. Selecting of this icon on the screen display causes the process vision display and control screen shown in FIG. 8 to be displayed. This enables an output from the video overlay card to be displayed as part of the display, as is seen in part 61 of the display of FIG. 8. As is shown, the system includes a crosshair generator which generates crosshairs 62, 63. These may be used to accurately direct the camera or the user's attention to a part of the image, for laser beam alignment, or for other purposes. In practice, the image will be of a workpiece and will be from the same direction as the laser beam which is used to operate on the workpiece. By moving button 64 horizontally in the Figure and button 65 vertically, then the position of the crosshair can be adjusted.

Figure 8:
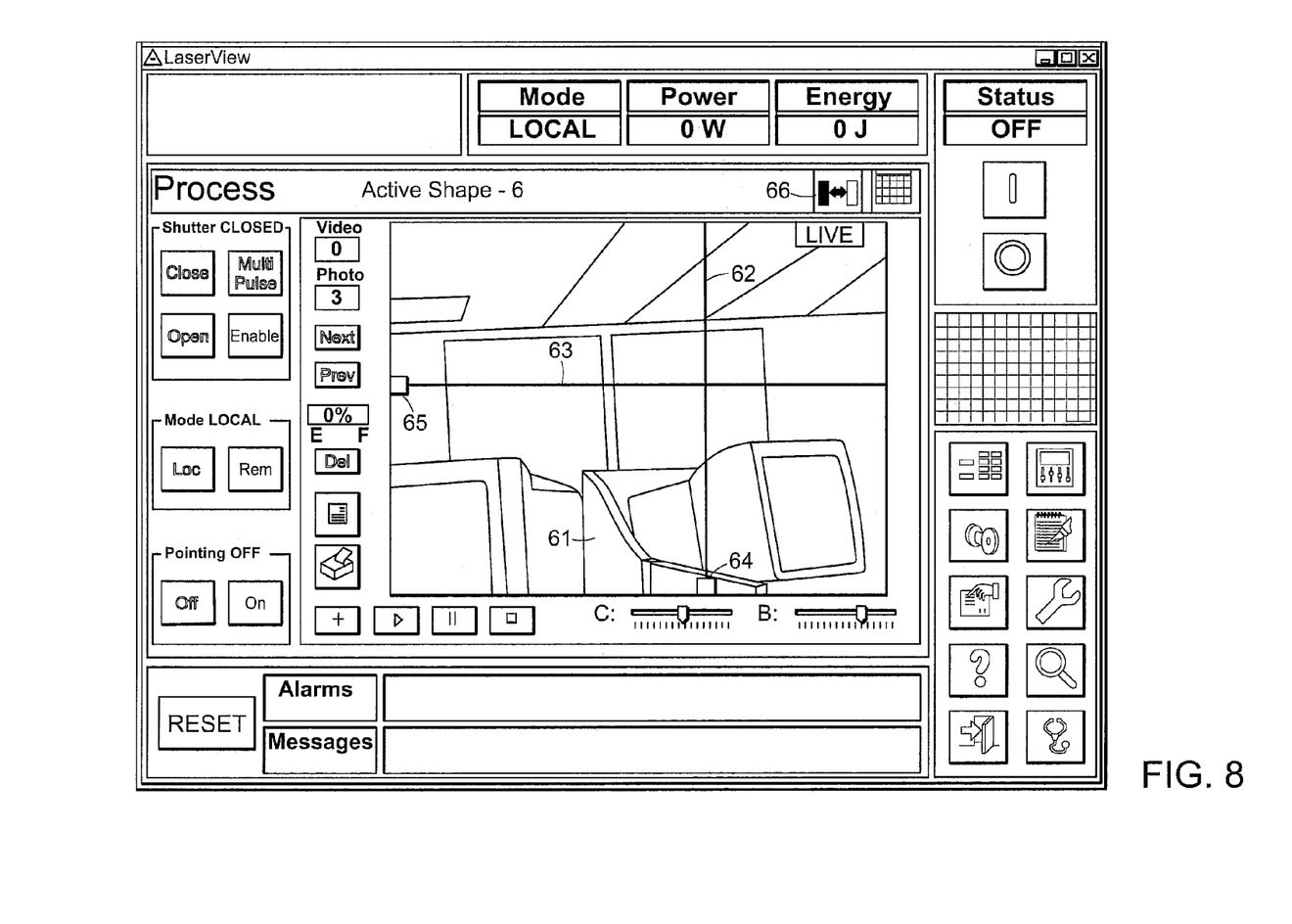

From within this process vision screen, the user may view the live camera image, freeze or display, take snapshots (photo mode) and record video footage (video mode). Button 66 may be used to adjust crosshair colour. In this example, it is from black to white but a range of colours may be used if appropriate. All images may be replayed or reviewed from within the process vision page.

As described, all the image files may also be retrieved via modem or network.

The invention claimed is:

1. Laser monitoring and controlling apparatus including a laser, a data server and a laser control system including a laser Graphical User Interface (GUI), wherein the data server includes at least one third party software interface for communication with a software program that is not designed to operate a laser system, wherein said laser control system and said third party software interface operate concurrently such that the laser is monitored and controlled by the GUI and by the third party software.

2. Apparatus as claimed in claim 1, wherein the data server includes a COM (Component Object Model) interface or DCOM interface.

3. Apparatus as claimed in claim 1, comprising a laser operating module, and an ActiveX component serving as the data server.

4. Apparatus as claimed in claim 1, comprising at least one further data application.

5. Apparatus as claimed in claim 1, wherein the data server application is installed on a single computer or separate computers or platforms.

6. Apparatus as claimed in claim 1, further including an additional controller connected to the laser by a digital interface.

7. Apparatus as claimed in claim 1, wherein the data server and laser GUI are provided on one platform and one or more further applications, COM enabled applications or other applications, are provided on a second computer or platform.

8. Apparatus as claimed in claim 7, wherein the computers or platforms are connected over a local area network, wide area network, or internet.

9. Apparatus as claimed in claim 8, wherein internet protocol or TCP/IP communication is used.

10. Apparatus as claimed in claim 1, wherein the graphical user interface is displayed to a user on a suitable display means or run in the background.

11. Apparatus as claimed in claim 1, further comprising an imaging means and means for displaying images from the imaging means on the GUI.

12. Apparatus as claimed in claim 11, wherein the imaging means is arranged to provide images of a workpiece operated on by a laser beam emitted from the laser.

13. A laser monitoring or controlling apparatus comprising a laser, a laser controller or monitoring means, a laser control system including a Graphical User Interface (GUI) for monitoring and/or controlling laser operation, an imaging means for displaying images from the imaging means on the GUI, wherein said laser controller or monitoring means provides that a plurality of computer interface programs are independently coupled to the laser monitoring or controlling apparatus for independently monitoring or controlling laser operation, at least one of said plurality of computer interface programs being not designed to operate a laser system, wherein said laser control system and each of said plurality of computer interface programs operate concurrently such that the laser is monitored and controlled by the GUI and by each of the plurality of computer interface programs.

14. Apparatus as claimed in claim 13, wherein a single display displays the GUI with, as required, the image displayed.

15. Apparatus as claimed in claim 13, wherein the imaging means is a video or still camera mounted so as to view the workpiece as it is being operated on by a laser beam from the laser.

16. A laser control system for controlling the operation of a laser that is coupled to an articulated assembly, said system comprising a data server that includes a laser and robot control system including a software interface that provides that a plurality of computer interface programs may be independently coupled to the laser controlling apparatus and to the articulated assembly for independently controlling laser operation and robotic articulation of the articulated assembly, each of said plurality of computer interface programs being not designed to operate a laser system or a robotic assembly, wherein said laser and robot control system and each of said plurality of computer interface programs operate concurrently such that the laser and the articulated assembly are monitored and controlled by the software interface and by each of the plurality of computer interface programs.

17. The system as claimed in claim 16, wherein the data server includes a component object module interface.

18. The system as claimed in claim 16, wherein the data server includes a distributed component object module interface.

19. The system as claimed in claim 16, wherein the system includes a plurality of computer processing units.

20. The system as claimed in claim 16, wherein at least one of computer interface programs may be run at a location that is remote from the laser and articulated assembly.

* * * * *

UNITED STATES PATENT AND TRADEMARK OFFICE
CERTIFICATE OF CORRECTION

| | | |
|---|---|---|
| PATENT NO. | : 7,331,512 B2 | Page 1 of 1 |
| APPLICATION NO. | : 11/288830 | |
| DATED | : February 19, 2008 | |
| INVENTOR(S) | : Simon George Caiger | |

It is certified that error appears in the above-identified patent and that said Letters Patent is hereby corrected as shown below:

Title page; item [65] add the following:

Related U.S. Application Data

Continuation of application No. PCT/GB2004/002550, filed on Jun. 14, 2004.

Foreign Application Priority Data

Jun. 16, 2003 (GB)                              0313887.2

In Col. 6, line 24, please delete "modern" and replace with --modem--.

Signed and Sealed this

Thirteenth Day of May, 2008

JON W. DUDAS
*Director of the United States Patent and Trademark Office*